United States Patent
Borgward

[19]

[11] Patent Number: 6,062,128
[45] Date of Patent: May 16, 2000

[54] TOASTER

[76] Inventor: Glenn Rolus Borgward, Whistlerweg 16, D-81479 Munich, Germany

[21] Appl. No.: 08/973,253

[22] Filed: Nov. 26, 1997

Related U.S. Application Data

[63] Continuation of application No. PCT/EP96/01711, Apr. 24, 1996.

[30]     Foreign Application Priority Data

Apr. 25, 1995 [DE] Germany ............................ 195 15 196

[51] Int. Cl.[7] .................................................. A47J 37/08
[52] U.S. Cl. ................................. 99/326; 99/331; 99/337; 99/341; 99/385; 99/386; 99/389; 99/391; 99/393; 99/400
[58] Field of Search ............................ 99/325–334, 341, 99/337, 338, 385–395, 400, 401, 426, 443 C, 444–450; 219/521, 400, 388

[56]                  References Cited

U.S. PATENT DOCUMENTS

| | | | |
|---|---|---|---|
| 1,697,914 | 1/1929 | Hummel et al. ............................ | 99/327 |
| 2,038,028 | 4/1936 | De Mattels ................................ | 99/386 |
| 2,182,229 | 12/1939 | Hamel ....................................... | 99/386 |
| 2,714,348 | 8/1955 | Fokakis ..................................... | 99/387 |
| 2,928,524 | 3/1960 | Jensen ..................................... | 99/386 X |
| 2,948,404 | 8/1960 | Harrod ..................................... | 99/326 X |
| 3,220,336 | 11/1965 | Hoover ..................................... | 99/443 C |
| 3,277,813 | 10/1966 | Luscher ..................................... | 99/386 |
| 3,418,920 | 12/1968 | Alexander .............................. | 99/443 X |
| 3,659,518 | 5/1972 | Porter ........................................ | 99/386 |
| 3,869,969 | 3/1975 | Sharp ........................................ | 99/327 |
| 4,226,176 | 10/1980 | Macchi ..................................... | 99/335 |
| 4,577,550 | 3/1986 | Maroti et al. .......................... | 99/391 X |

FOREIGN PATENT DOCUMENTS

| | | |
|---|---|---|
| OS 2 333 619 | 1/1974 | Germany . |
| GM 88 02 102 | 5/1988 | Germany . |

*Primary Examiner*—Timothy Simone
*Attorney, Agent, or Firm*—Marshall, O'Toole, Gerstein, Murray & Borun

[57]                  ABSTRACT

A toaster with at least one toasting chamber for receiving goods to be toasted such as slices of toast is disclosed. The toaster has at least one loading opening and at least one discharge opening for loading goods to be toasted and for removing toasted goods. It also includes a transport device for transporting toasted goods through the toaster. The functional elements of this toaster are surrounded by a wall of a housing supported on a chassis. The transport device moves one or several pieces of toasted goods in the toasting chamber by means of a spiral guiding system on a spiral transport path from the loading opening to the discharge opening. At the same time, the toasted goods are continuously and substantially uniformly exposed to the heat irradiated by at least one spiral heating element.

24 Claims, 5 Drawing Sheets

TOASTER

RELATED APPLICATION

This application is a continuation of International Application PCT/EP96/01711, filed Apr. 24, 1996.

FIELD OF THE INVENTION

The present invention relates generally to toasters and, more particularly, to a toaster with at least one toasting chamber for receiving the goods to be toasted, such as slices of toast.

BACKGROUND OF THE INVENTION

A toaster is known from the publication DE-GM 88 02 102, which has the following: a carrier part onto which a roll and an electric motor are secured, a first switch and a second switch, a transport band, a first heating element consisting of a first housing with a first housing inner edge, a first reflector, a first heating body as well as an infrared cell, and a second heating element consisting of a second housing, a second housing inner edge, a second reflector as well as a second heating body.

This known toaster contains a transport device driven with the aid of an electric motor, with a transport band for the goods to be toasted, a speed control device for the electric motor, which operates as a function of the degree of browning of the goods to be toasted, an automatic switching device for the electric motor, which is activated as a function of an output signal of the infrared cell, in order to turn on the drive for the electric motor of the transport device after reaching a predetermined toasting temperature, as well as an adjusting device for manual correction of the speed of operation of the transport device.

The toaster according to the state of the art also has the function of automatic switching off with the aid of an automatic timer and the function of automatic removal of crumbs of the goods to be toasted from the working area. With the aid of the transport device, the necessity of an expensive ejection mechanism is eliminated.

REPRESENTATIVE OBJECTS OF THE INVENTION

The task of the present invention is to create a toaster with a transport device for the goods to be toasted and with the other known advantageous characteristics of such a device, which has a compact and thus space-saving construction, in which the pieces of the goods to be toasted can be introduced without interrupting the toasting process of the previously introduced pieces of goods to be toasted, in which the pieces of goods to be toasted are exposed continuously and essentially uniformly to heat radiation and in which no ejection mechanism is necessary.

SUMMARY OF THE INVENTION

In accordance with an aspect of the invention, a toaster is provided. The toaster includes a housing defining a toasting chamber, a loading opening in communication with the toasting chamber for loading goods to be toasted therein, and a discharge opening in communication with the toasting chamber for discharging the toasted goods therefrom. The toaster also includes a spiral shaped element and a guide defining a spiral-shaped transport path through the toasting chamber from the loading opening to the discharge opening. In addition, the toaster is provided with a rotary transport device at least partially disposed within the housing for moving goods to be toasted along the spiral-shaped transport path such that the goods to be toasted are exposed to the heat given off by the spiral-shaped heating element.

Other features and advantages are inherent in the apparatus claimed and disclosed or will become apparent to those of ordinary skill in the art from the following detailed description and its accompanying drawings.

DETAILED DESCRIPTION OF THE PREFERRED EMBODIMENTS

Figure 1:
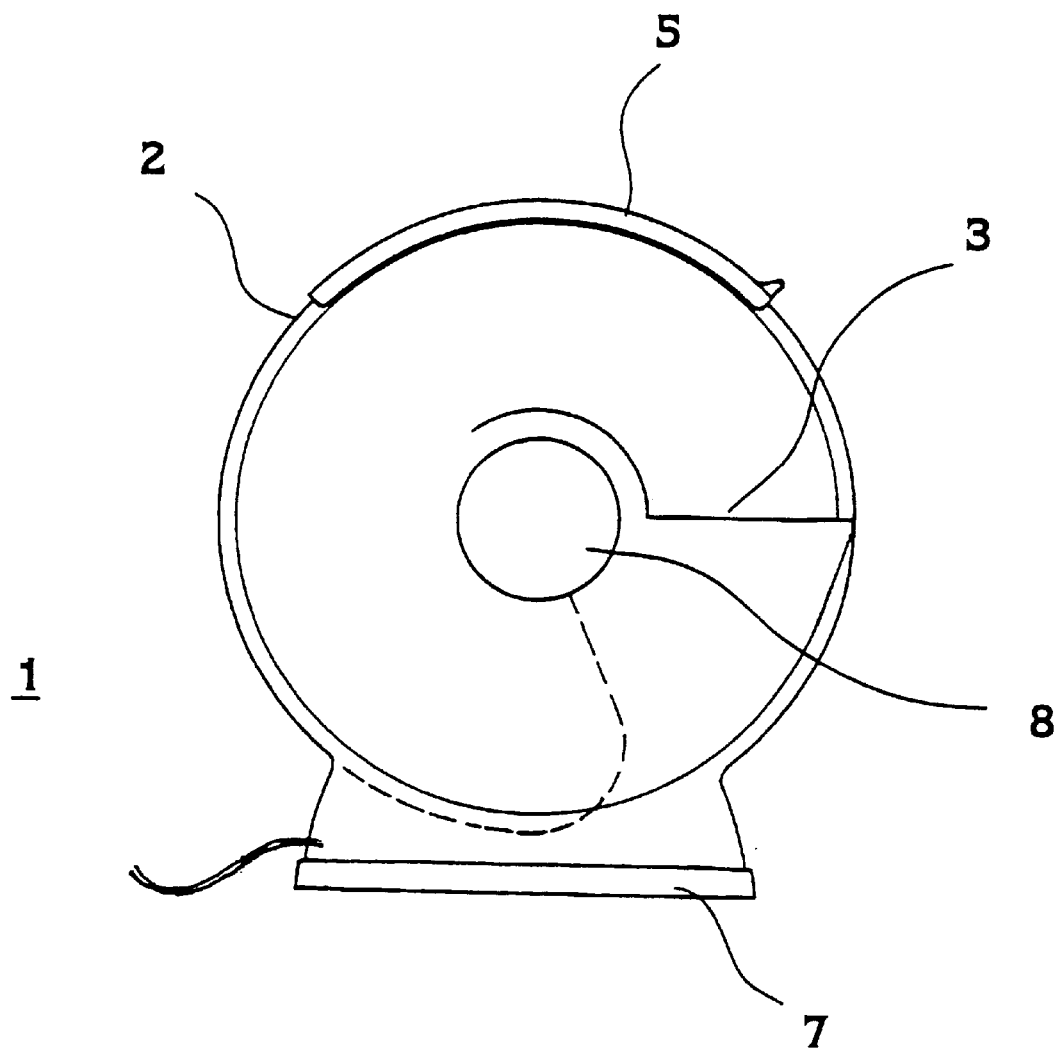
FIG. 1 shows a side view of a preferred practical example of a toaster constructed in accordance with the teachings of the invention, in the completely assembled state.

As already stated, FIG. 1 shows a side view of a preferred practical example a toaster constructed in accordance with the teachings of the invention in the completely assembled state. The toaster 1 shown in FIG. 1 has a coil-like housing 2, which surrounds a toasting chamber for accepting the goods to be toasted, especially slices of toast, in which a loading opening 3 and a discharge opening 4 (see FIG. 3) are provided respectively for loading the goods to be toasted and discharging the toasted goods. Housing 2 surrounds a transport device for the goods to be toasted. The functional components of the toaster are arranged within housing 2, which is supported on a housing chassis and contains operating and/or display devices incorporated in it. The transport device is a rotary transport device which transports one or several pieces to be toasted with a rolling movement of the goods to be toasted in the toasting chamber. The transport device is aided in this function by a spiral guide system 12 (see FIG. 2) which can be designed as a perforated grid arrangement, on a spiral transport path from the loading opening 3 to the discharge opening 4 (see FIG. 3). The goods to be toasted are exposed continuously and essentially uniformly to the heat radiation given off by at least one spiral heating element 11 (see FIG. 2).

Figure 2:
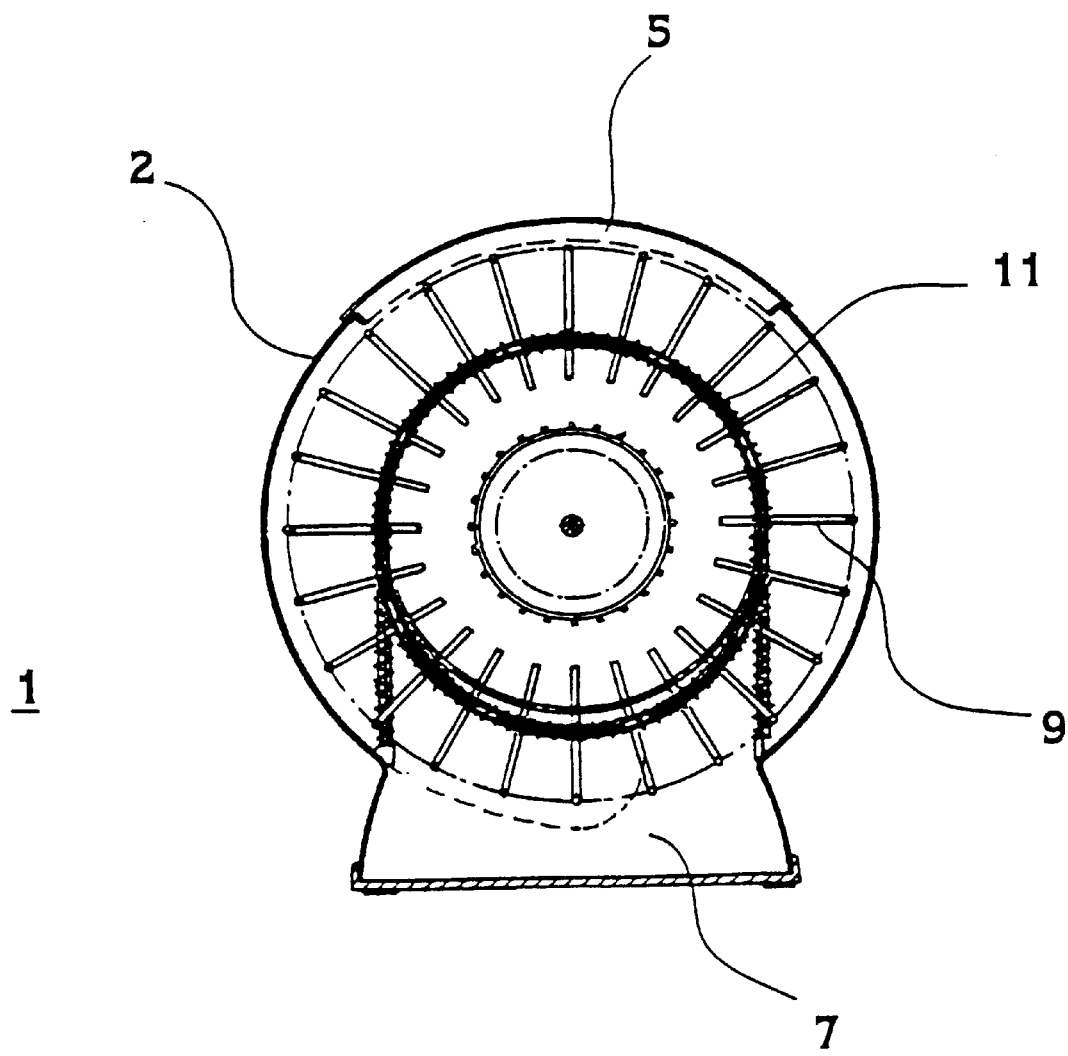
FIG. 2 shows a longitudinal section of the practical example illustrated in FIG. 1.
Figure 3:
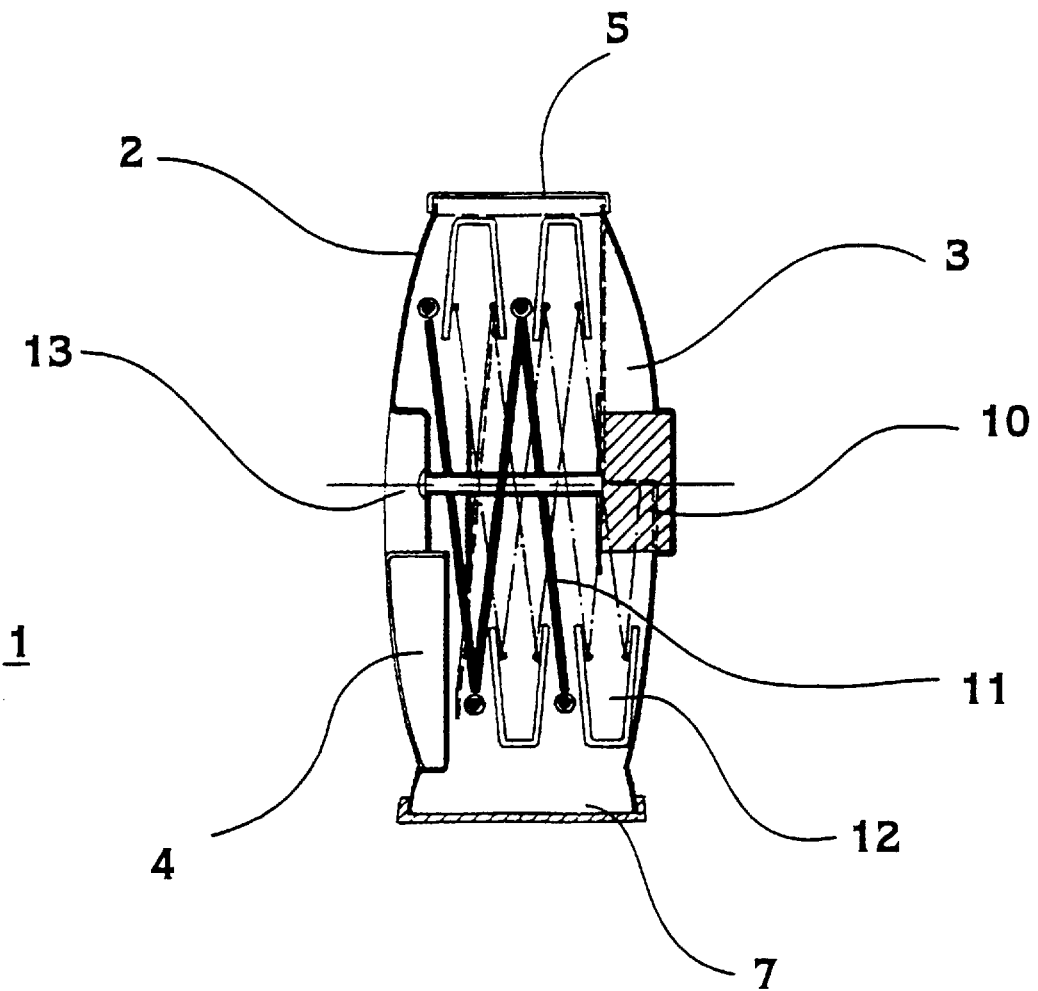
FIG. 3 shows a transverse view of the practical example illustrated in FIG. 1.
Figure 4:
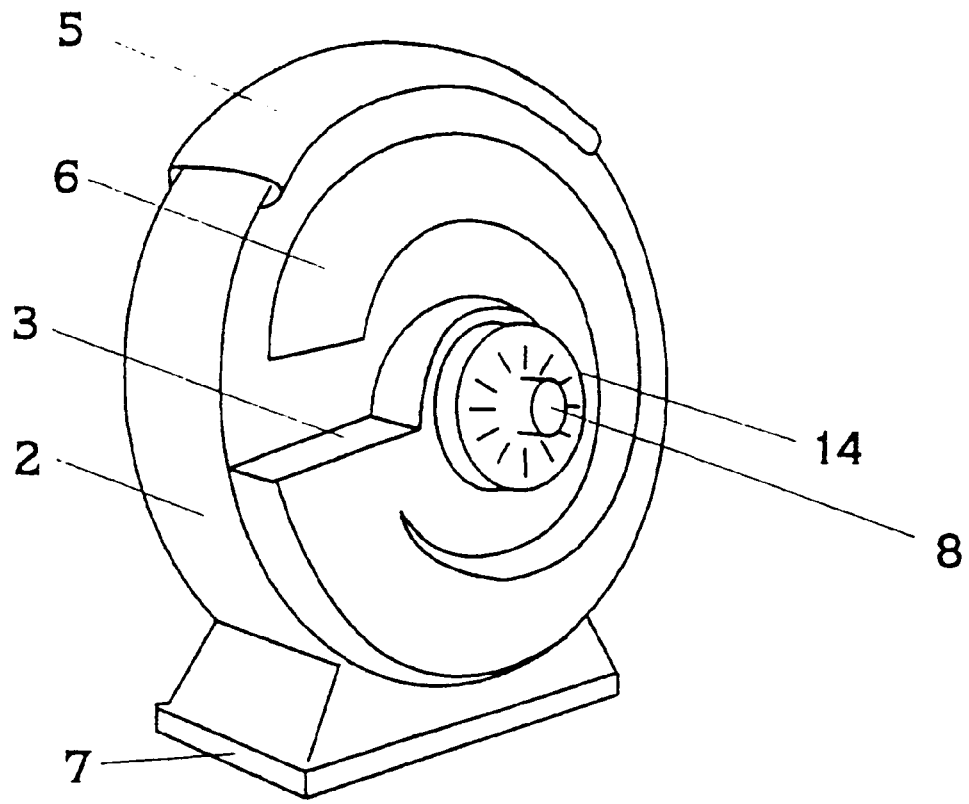
FIG. 4 shows a perspective representation of the practical example illustrated in FIG. 1, in the completely assembled state.

As can be seen from FIG. 2, the middle axis of the spiral shape of the transport path is oriented parallel to the bottom surface. The bottom surface serves as a supporting surface of a foot pan 7 for toaster 1 which is opened when necessary to catch the crumbs. The spiral shape is formed with at least one complete revolution around the middle axis. A shaft 13, which carries a freely rotatable running wheel 9 is provided concentrically with the middle axis. In cooperation with shaft 13, the running wheel 9 moves the goods to be toasted from the loading opening 3 with a substantially uniform rolling motion, substantially through the entire length of the middle axis on the spiral-shaped transport path all the way to the discharge opening 4. The distance between shaft 13 and the running wheel 9 is slightly smaller than the smallest diameter of toast pieces occurring in practice, so that, due to the deformability of the toast pieces, a sufficient frictional contact exists between shaft 13, the piece of toast and the internal peripheral surface of running wheel 9. The goods to be toasted are then passed by at least one heating element 11, whereby, in succession, the goods are exposed on one side, then on both sides and finally on the other side to heat radiation produced by the a heating element 11. Shaft 13 is preferably supported so that it has a play in the radial direction. As a result, while it moves a piece of goods to be toasted through the guidance system on the spiral-shaped transport path in a rolling manner, with the aid of frictional forces between it and the piece of goods to be toasted, it can adapt its position to the periphery of the piece of goods to be toasted. For this purpose, the shaft 13 can be made of a cylindrical body which is elastically deformable, at least in the radial direction.

The rotation of shaft 13 and, thus, of the running wheel 9 is produced by a rotary drive 10 arranged at the housing wall. The rotary means 10 can preferably consists of a 220 V ac motor. When using the toaster 1 as camping equipment, the rotary drive 10 can be a 12 V dc motor.

The rotary drive 10 is arranged either on the outside of the housing or is integrated into the housing 2. According to one embodiment, the speed of rotation of the rotary drive can be adjusted continuously, preferably by a control device.

Preferably, in the known manner, the control device can control the speed of rotation of the rotary drive 10 automatically as a function of the degree of browning of the goods to be toasted. For this purpose, the degree of browning is detected with the aid of a photocell to which an appropriate switching device is connected.

In another embodiment, an adjusting element 8 is provided for controlling the speed of rotation of the rotary drive 10 manually. The speed of rotation of the rotary drive can be adjusted in at least two steps in this case.

Advantageously, a scale 14 can be arranged around the adjusting element 8 on the outside of housing 2 (see FIG. 1).

A window 6 can be provided in at least one of the side walls of the housing to observe the goods to be toasted (see FIG. 1).

Preferably, on the top side of housing 2, a heat outlet opening is provided. The housing 2 can be designed as a toasting rack, the top side being designed in such a way that an external toasting rack can be set on it to increase the useful toasting surface, safe against tipping.

It is provided that a sliding cover 5 can be applied on housing 2. The sliding cover 5 is adapted to the shape of the housing. With the aid of the sliding cover 5 the heat outlet opening (not shown) can be optionally closed or opened.

In addition, a child safety device is provided in the form of a mechanism that protects against opening (not shown).

According to an embodiment, the housing is designed in such a way that the toaster 1 can be used as table-top equipment. Alternatively to that, the housing can be designed so that the toaster can be used as a wall unit. Finally, the housing can be designed so that the toaster can be used as free-standing equipment, for example, set on a wrought iron stand.

Advantageously, a known thermostatic control device can be provided to protect the toaster against overheating.

Instead of an electrically operated rotary drive, as described before, naturally, with appropriate structural design, the toaster can be provided with any other means of driving.

The "at least one" heating element, which is designed as a spiral, is preferably electrically heatable. Alternatively, for example, gas heating could be provided.

From the foregoing, it will be appreciated that a toaster constructed in accordance with the teachings of the invention has the following advantages in comparison to the equipment of the art for roasting/toasting:

Toast or the like can be roasted/toasted in succession without interruption.

During the roasting/toasting process, bread and other baked goods can be heated or baked with the aid of an external toasting rack. The external toasting rack can be set on top of the heat outlet opening, without having to interrupt the operation of the toaster.

Only a few moving mechanical parts are needed.

Crumbs can be removed easily.

The toaster can be closed securely with the aid of a sliding cover so that children cannot introduce any objects into the equipment.

The user does not have to come into contact with the heated area in order to introduce the goods to be toasted.

The toasting process can be observed through the window in the side wall of the housing.

Uniform browning is achieved by rolling the pieces of goods to be toasted.

The toaster can be designed to save space.

The form of the toaster arising from the principle of operation according to the invention advantageously provides a pleasing design, which makes its use on the table more attractive in comparison to the corresponding conventional equipment.

Depending on the type of use, the principle of the toaster according to the invention permits change in its dimensions, so that large amounts of pieces to be toasted can be handled rapidly, which is advantageous for gastronomical applications.

Figure 5:
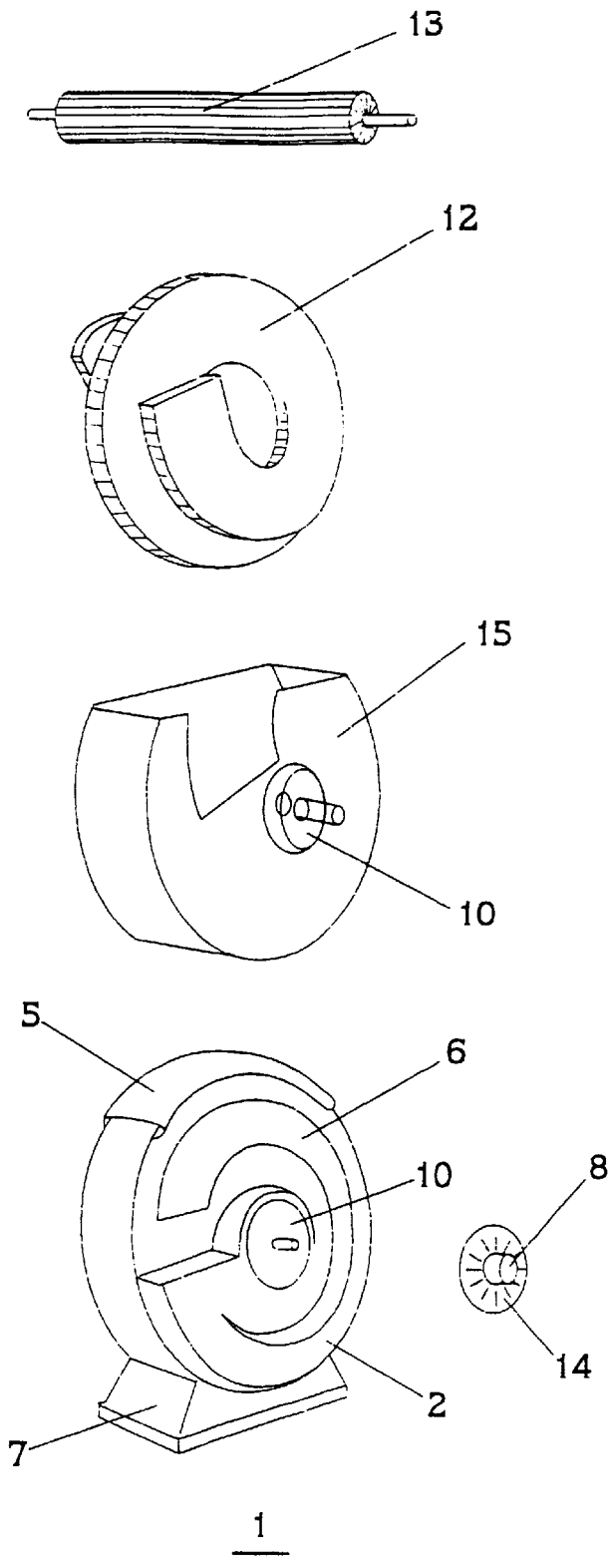
FIG. 5 shows a perspective view in the form of an exploded drawing of the preferred practical example of FIG. 1 to further explain the mechanical structure of the toaster.

Finally, toasters constructed in accordance with the teachings of the toaster according to the invention can be provided with a heat shield 15 (see FIG. 5).

Those skilled in the art will appreciate that, although the invention has been described in connection with certain embodiments, there is no intent to limit the invention thereto. On the contrary, the intention of this application is to cover all modifications and embodiments fairly falling within the scope of the appended claims either literally or under the doctrine of equivalents.

I claim:

1. A toaster comprising:
   a housing defining a toasting chamber, a loading opening in communication with the toasting chamber for loading goods to be toasted therein, and a discharge opening in communication with the toasting chamber for discharging the toasted goods therefrom;
   a guide defining a spiral-shaped transport path through the toasting chamber from the loading opening to the discharge opening;
   a spiral-shaped heating element; and
   a rotary transport device at least partially disposed within the housing for moving goods to be toasted along the spiral-shaped transport path such that the goods to be toasted are exposed to the heat given off by the spiral-shaped heating element.

2. A toaster as defined in claim 1, wherein the housing further includes a foot pan for catching crumbs from the goods.

3. A toaster as defined in claim 1 wherein the spiral-shaped transport path has a middle axis, and the spiral-shaped transport path makes at least one complete revolution around the middle axis between the loading opening and the discharge opening.

4. A toaster as defined in claim 3 wherein the rotary transport device comprises a shaft carrying a wheel, and the shaft is located concentrically with the middle axis.

5. A toaster as defined in claim 4 wherein the wheel moves the goods to be toasted on the spiral transport path from the loading opening to the discharge opening with a substantially uniform rolling motion over at least a portion of the length of the middle axis such that the goods to be toasted are exposed in succession on a first side, then on the first side and a second side opposite the first side, and, subsequently on the second side to heat produced by the heating element.

6. A toaster as defined in claim 4 wherein the shaft is supported in such a way that it has play in the radial direction.

7. A toaster as defined in claim 4 wherein the shaft comprises a cylindrical body which is elastically deformable in at least a radial direction.

8. A toaster as defined in claim 1 further comprising a rotary drive for driving the rotary transport device.

9. A toaster as defined in claim 8 wherein the rotary drive comprises an ac motor.

10. A toaster as defined in claim 8 wherein the rotary drive comprises a dc motor.

11. A toaster as defined in claim 8 wherein the rotary drive is located on the outside of the housing.

12. A toaster as defined in claim 8 wherein the rotary drive is located within the housing.

13. A toaster as defined in claim 8 further comprising a control device for controlling a speed of rotation of the rotary drive.

14. A toaster as defined in claim 13 wherein the control device controls the speed of rotation of the rotary drive as a function of a degree of browning of the goods to be toasted.

15. A toaster as defined in claim 8 further comprising a manually engageable adjusting element for controlling a speed of rotation of the rotary drive.

16. A toaster as defined in claim 15 wherein the speed of the rotary drive can be adjusted in at least two steps.

17. A toaster as defined in claim 8 further comprising a scale located adjacent the adjusting element on the outside of the housing.

18. A toaster as defined in claim 1 wherein the housing further comprises a window for observing the goods to be toasted.

19. A toaster as defined in claim 1 wherein the housing further comprises a top and a heat outlet opening defined in the top of the housing, the housing being adapted to receive an external toasting rack adjacent the heat outlet opening to increase the useful toasting surface of the toaster.

20. A toaster as defined in claim 19 further comprising a sliding cover for selectively opening and closing the heat opening.

21. A toaster as defined in claim 1 further comprising a thermostatic control device to protect the toaster from overheating.

22. A toaster as defined in claim 1 wherein the toaster comprises a table-top unit.

23. A toaster as defined in claim 1 wherein the toaster comprises a wall unit.

24. A toaster as defined in claim 1 wherein the toaster comprises a free-standing unit.

* * * * *